United States Patent [19]

Avigal et al.

[11] 4,256,814

[45] Mar. 17, 1981

[54] PHOTOELECTRO-CHEMICAL CELL SYSTEM

[75] Inventors: Yitzhak Avigal, Givataim; David Cahen, Rehovot; Gary Hodes, Rehovot; Joost Manassen, Rehovot, all of Israel

[73] Assignee: Yeda Research and Development Co. Ltd., Rehovot, Israel

[21] Appl. No.: 68,450

[22] Filed: Aug. 21, 1979

[30] Foreign Application Priority Data

Sep. 1, 1978 [IL] Israel ......................................... 55477

[51] Int. Cl.³ ............................................. H01M 6/30
[52] U.S. Cl. ................................... 429/111; 126/434; 204/237; 429/14; 429/15; 429/51
[58] Field of Search ........................... 429/111, 14–15, 429/51; 136/89 PC, 89 HY; 204/237–239; 126/434

[56] References Cited

U.S. PATENT DOCUMENTS

| | | | |
|---|---|---|---|
| 3,620,942 | 11/1971 | Day et al. | 204/68 |
| 3,728,234 | 4/1973 | Sakai et al. | 204/68 |
| 4,033,325 | 7/1977 | Walker | 126/434 |
| 4,042,758 | 8/1977 | Weinstein et al. | 429/111 |
| 4,045,246 | 8/1977 | Mlavsky et al. | 136/89 PC |
| 4,052,228 | 10/1977 | Russell | 136/89 PC |
| 4,055,055 | 10/1977 | Horwitz | 62/238 |
| 4,081,289 | 3/1978 | Campbell | 136/89 PC |
| 4,146,407 | 3/1979 | Litsenko et al. | 136/89 PC |
| 4,172,925 | 10/1979 | Chen et al. | 429/111 |

FOREIGN PATENT DOCUMENTS

| | | | |
|---|---|---|---|
| 592303 | 9/1947 | United Kingdom | 136/89 |
| 971297 | 9/1964 | United Kingdom | 357/14 |
| 2020696 | 11/1979 | United Kingdom | 429/111 |

OTHER PUBLICATIONS

M. A. Duguay, "Solar Electricity: The Hybrid System Approach", *American Scientist*, vol. 65, pp. 422–427, (1977).

Primary Examiner—Aaron Weisstuch
Attorney, Agent, or Firm—Sandler & Greenblum

[57] ABSTRACT

A system comprising a photoelectro-chemical cell for converting light into electrical energy in combination with cooling means for cooling the cell.

A method for generating electrical energy with a photoelectro-chemical cell comprising the step of cooling the cell.

A method of reducing concentration polarization in photoelectro-chemical cells comprising at least two electrodes and an electrolyte. The method comprises the step of circulating the electrolyte by means of a thermosyphon.

13 Claims, 1 Drawing Figure

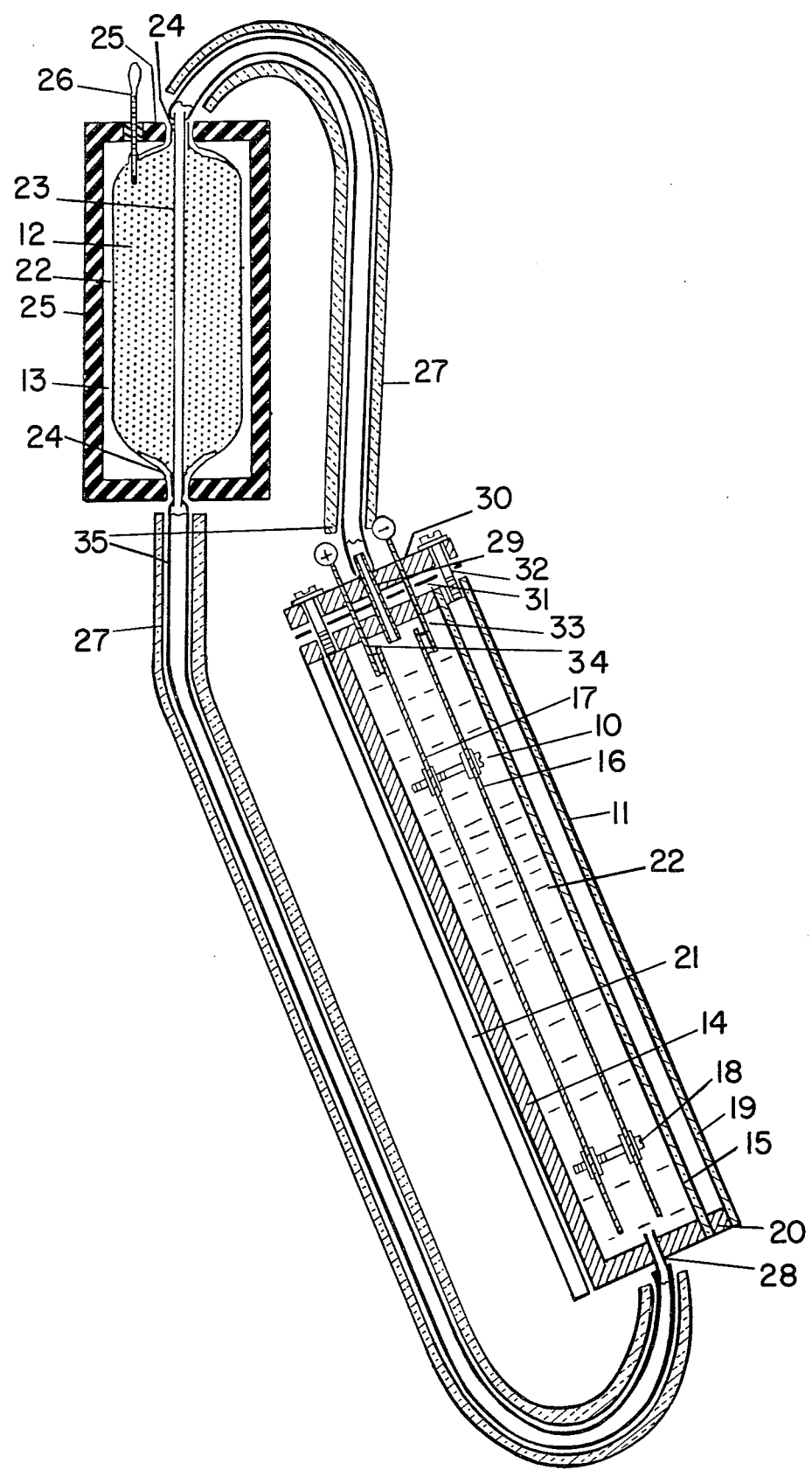

PHOTOELECTRO-CHEMICAL CELL SYSTEM

BACKGROUND OF THE INVENTION

1. Field of the Invention

The present invention relates to a novel system combining a photo-electrochemical solar cell (PEC) and a thermosyphon. The system according to the invention results in an improved overall utilization of solar energy and in the substantial reduction of undesired effects encountered with PEC's, particularly when operated at a high intensity of incident solar radiation.

2. Description of Prior Art

Photoelectro-chemical cells are used for the conversion of solar energy into electrical energy. This results from the light-induced formation of an electrical potential between a semiconducting electrode and a counterelectrode which are immersed in a suitable electrolyte consisting of or comprising a redox couple. Up to about 5% of the solar energy is converted to electrical energy when polycrystalline semiconductor electrodes are used and up to about 12% with single-crystal semiconductor electrodes. A few percent of the energy is dissipated by reflection, whereas the rest is converted into thermal energy and is retained in the cell. The retention of the thermal energy has some negative effects, and amongst these there may be mentioned thermal expansion of various components and serious corrosion problems.

Attempts have been made to combine solid-state photovoltaic cells with heat exchange liquids, see Dugway: American Scientist 65 (1977) 422. In such systems the heat transfer from the solar panel to the heat absorption fluid was not solved in a satisfactory manner.

SUMMARY OF THE INVENTION

It is, therefore, an object of the invention to provide means for cooling a cell so as to enable it to operate effectively and efficiently.

These and other objects are fullfilled by means of the system of the invention which comprises a photoelectro-chemical cell for converting light into electrical energy in combination with cooling means for cooling the cell.

The objects of the invention are further fullfilled according to the method of the invention which comprises generating electrical energy with a photoelectrochemical cell, the method comprising the step of cooling the cell.

According to a preferred embodiment of the present invention a system is provided comprising in combination a photoelectro-chemical cell (PEC) and a thermosyphon, resulting in an improved performance of the PEC and in an enhanced utilization of solar energy, while certain undesired side-effects due to thermal heating in the PEC are eliminated.

As part of yet another preferred embodiment of the invention the electrolyte is circulated to minimize concentration polarization within the cell.

The thermosyphon results in a flow of the electrolyte through the PEC, from which it circulates, or first flows to a reservoir, from which the liquid can be subsequently recirculated. In the course of its flow, the heated electrolyte can be contacted by way of a heat exchanger with a suitable medium, thus extracting thermal energy from the electrolyte and utilizing it afterwards for any desired purpose.

The circulation of the electrolyte through the PEC reduces concentration polarization between the photoelectrode and the counterelectrode. This makes it possible to operate the cell at increased current densities, while the heat absorbed is utilized. As this can constitute up to about 80 or 85% of the total solar energy absorbed by the cell, the overall energy utilization and conversion is drastically improved; up to about 50% of the thermal energy can be utilized for heating the liquid contacted with the electrolyte via the heat-exchanger.

Electrolytes used in conventional types of PEC are frequently colored (polysulfide solutions or polyiodide solutions) and this results in enhanced heat absorption by the electrolyte. Such electrolytes are quite corrosive and the corrosive damage is substantially increased as temperature increases. Removal of a large part of the thermal energy via the heat-exchanger substantially reduces the corrosive effects.

According to the present invention the thermosyphon is preferably constructed from suitable materials resistant to the corrosive effects of the electrolyte, even at elevated temperatures. The PEC itself can be positioned in a container of any suitable shape. It may be curved, which results in a concentration of the incident radiation; or it may be flat, in which case less electrolyte is required and the photoelectrode can be closer to the front of the cell. The cell is advantageously thermally insulated, and this applies also to the conduits to the heat exchanger. Heat losses are thereby minimized. The removal of unwanted heat from the PEC increases effective cell life.

There exist some systems which differ to a certain extent from what has been described above. There exist certain types of PECs in which the photocorrosion of the photoelectrode is lower at elevated temperatures. As the photoelectrode is actually the component which attains the highest temperature—especially when the layer of the electrolyte in front of the electrode is a thin one—it is possible to construct PECs of this type wherein a high electrode temperature is used, while excess heat above the desired operating temperature is rapidly removed by circulation via the thermosyphon and heat-exchange. The photoelectrode comprises in most cases a polycrystalline layer of semiconductor deposited on a metallic base. Besides converting light into electrical energy, these electrodes also act as so called dark mirrors. Thus although the electrodes absorb energy in the visible and near infrared part of the solar spectrum they nevertheless emit less thermal radiation less than a nonselective black surface.

BRIEF DESCRIPTION OF THE DRAWING

The invention is illustrated with reference to the enclosed schematic drawing, which is not according to scale, and in which FIG. 1 is a perspective view of the system according to the invention in partial section.

DESCRIPTION OF PREFERRED EMBODIMENTS

As shown in attached FIG. 1, the system according to the present invention comprises in combination a PEC 11 which also serves as solar heat-collector, connected via conduits 28 and 29 to the heat-exchanger 13.

The PEC-Solar Collector 11 comprises, in combination, a housing 14 provided at its front with a rectangular window 15, which is advantageously glued to the housing 14, in which housing there are positioned the photoelectrode 16 and the counterelectrode 17, both of which are parallel with each other and face the window. The electrodes are spaced by means of plastic screws 18. An additional glass window 19 is provided in front of window 15, to provide for better heat insulation. This window is spaced from the first window by spacers 20, and there is provided a further heat-insulating layer 21 made of foamed polyurethane. An electrolyte 22 is provided in the cell. In an experimental cell the dimensions were as follows: External dimensions about 102×6.5×1.5 cm, internal dimensions 100×4×1 cm. The glass window was 100×6.5×0.3 cm; the spacers were 0.5 cm thick. The heat insulating layer 21 was 102×6.5×3 cm. The photoelectrode 16 had an area of 300 cm and the counterelectrode 17 was made of sulfidized brass and had an area of 95×4 cm. The PEC-solar collector 11 is covered by a PVC cover 30 which is connected to the housing 14 by stainless steel screws 32. A chemically resistant gasket (such as, e.g., a silicon rubber seal) 31 seals the cover 30 from the housing 14. Current collectors 33 and 34 extend through the cover and are connected to the electrodes 16 and 17.

The heat exchanger 13 comprises a glass container 22 containing a concentric stainless steel tubular heat exchanger 23. The steel tube is glued by silicone glue 24 to the upper and lower parts of the glass cylinder. The dimensions of the experimental model were as follows: The glass cylinder had an inner diameter of 5.5 cm, an outer diameter 6 cm, and a length of 50 cm. The steel heat exchanger 23 had an internal diameter of 0.8 cm and an outer diameter of 1 cm, its length being 65 cm. At the top of the cylinder there is provided an entrance via insulating layer 25 through which there is inserted a thermometer 26 into an opening in the glass cylinder. The storage cylinder is surrounded by a layer of 2 cm thickness of foamed polyurethane, 25. The heat exchanger is connected to the PEC by stainless steel tubes 28 and 29 and by flexible plastic tubing 35 of internal diameter 1 cm and outer diameter 1.6 cm, surrounded by a foamed polyurethane layer 27 of 1 cm thickness.

The electrode used was 1 M S, 1 M Na$_2$S and 1 M KOH.

EXAMPLE 1

The system described above was tested as follows: The collector window 15 was oriented towards the south at a 45 degree tilt. Ambient temperature was 22 degrees C. at 9 a.m. and 31 degrees C. at 12 a.m. The water temperature was 27 degrees C. at 9 a.m. and 55 degrees C. at 12 a.m. The open circuit voltage was 0.6 V, short circuit current 1.2 A and electrical power over a 1 ohm load of 0.25 W.

Two systems identical to FIG. 1 were used. In one system, circulation of the electrolyte was permitted and in the other it was blocked. The heat rose to 72 degrees C. in the PEC which was not connected with the syphon, and only to 55 degrees C. in the operating thermosyphon system.

EXAMPLE 2

The effect of color on the heating of an electrolyte was determined by introducing colored electrolyte solutions into 4 test tubes. The tubes were closed by stopcocks and insulated by a further external glass tube at a certain distance. The electrolytes were of different concentration and thus of different color. After 2 hours exposure to solar radiation the following temperatures were measured: (Ambient: 32 degrees C.)

| | Water | Electrolyte, conc in M | | |
|---|---|---|---|---|
| Conc. | — | 1 M [S°] | 2 M [S°] | 0.5 M [I°] |
| T° (C.) | 37.5 | 46 | 48 | 52 |

EXAMPLE 3

The effect of coatings of titanium was determined by introducing two strips of titanium coated with velvet black and with CdSe coating respectively into test tubes, and this was compared with a test tube of similar dimensions containing only water. After 2 hours of solar irradiation, the temperature in the control test tube was 50 degrees C., in that with the velvet carbon black coating: 56 degrees C. and in that with the CdSe coating: 60 degrees C.

EXAMPLE 4

The effect of planar versus curved housings was determined by inserting electrodes into housings provided with a flat window and with a curved one, respectively. The curved housing was cylindrical having a 3 cm outer diameter. Under identical irradiation, with 1.5 cm×0.5 cm photoelectrodes the results were as follows:

| Distance from window: (mm) | Flat: | 3 | 13 | Curved: | 3 | 13 |
|---|---|---|---|---|---|---|
| Short circuit current (mA) | | 7.5 | 7 | | 8.5 | 11 |

EXAMPLE 5

Two identical PEC's were operated under identical conditions, with the one difference being that through one PEC the electrolyte was circulated at a rate of circulation of 100 ml/minute. The systems were as set out above. The electrical performance was recorded over prolonged periods of time under short circuit conditions. The deactivation effect of photocorrosion is evident from the following Table:

| | Short Circuit Current (mA/cm) | | |
|---|---|---|---|
| | Start: | 1 Week | 4 Weeks |
| PEC with circulation: | 8.5 | 8.0 | 8.0 |
| PEC without circulation: | 8.7 | 7.7 | 7.3 |

The above description is by way of illustration only and various changes and modifications of the construction may be resorted to without departing from the scope and spirit of the present invention as defined by the claims.

What is claimed is:

1. A system comprising a photoelectro-chemical cell containing an electrolyte for converting light into electrical energy, said photoelectro-chemical system further comprising thermosyphon means for circulating said electrolyte throughout said system.

2. The system as defined by claim 1 further comprising heat removal means for removing heat from said electrolyte thereby cooling said electrolyte upon removal of said electrolyte from said cell by said thermosyphon means.

3. The system as defined by claim 2 wherein said thermosyphon means is adapted to remove said electrolyte from said cell and to return said cooled electrolyte to said cell.

4. The system as defined by claim 3 wherein said heat removal means comprises a heat exchanger for removing heat from said electrolyte.

5. The system as defined by claim 3 wherein said thermosyphon means consists of a line through which said electrolyte passes and said heat exchanger, said line being positioned at least partially above said cell.

6. The system as defined by claim 5 wherein said electrolyte is colored whereby said electrolyte is adapted to collect a high percentage of incident solar radiation as heat while in said cell.

7. The system as defined by claim 6 wherein said cell further comprises an electrode and a counterelectrode.

8. The system as defined by claim 7 wherein said heat exchanger is insulated so as to minimize heat losses.

9. The system as defined by claim 8 wherein said electrode comprises a polycrystalline layer deposited on a metallic base whereby said electrode acts as a dark mirror.

10. A method for generating electrical energy with a photoelectro-chemical cell comprising an electrolyte, said method comprising the step of circulating said electrolyte through said cell by means of a thermosyphon.

11. A method as defined by claim 10 further comprising circulating said electrolyte through and out of said cell, cooling said removed electrolyte, and returning said cooled electrolyte into said cell.

12. The method as defined by claim 11 further comprising cooling said electrolyte by circulating said removed electrolyte through a heat exchanger wherein said electrolyte releases heat to heat a fluid.

13. The method as defined by claim 12 further comprising using said heated fluid as an energy source.

* * * * *